United States Patent [19]

Bötsch et al.

[11] 4,286,078
[45] Aug. 25, 1981

[54] PROCESS FOR THE CONTINUOUS MANUFACTURE OF VINYL CHLORIDE POLYMERS

[75] Inventors: Franz Bötsch, Burgkirchen; Helmut Kraus, Burghausen, both of Fed. Rep. of Germany

[73] Assignee: Hoechst Aktiengesellschaft, Fed. Rep. of Germany

[21] Appl. No.: 62,043

[22] Filed: Jul. 30, 1979

Related U.S. Application Data

[63] Continuation of Ser. No. 891,192, Mar. 29, 1978, abandoned.

[51] Int. Cl.³ .................. C08F 14/06; C08F 259/04
[52] U.S. Cl. .................................. 525/317; 526/216; 526/344.2; 526/911
[58] Field of Search .................. 526/216, 344.2, 911; 525/317

[56] References Cited

U.S. PATENT DOCUMENTS

| | | | |
|---|---|---|---|
| 3,068,184 | 12/1962 | Noorduyn et al. | 526/344.2 |
| 3,370,031 | 2/1968 | Grommers et al. | 526/911 |
| 3,562,229 | 2/1971 | Bauer et al. | 526/911 |
| 3,624,051 | 11/1971 | Bauer et al. | 526/344.2 |

*Primary Examiner*—Harry Wong, Jr.
*Attorney, Agent, or Firm*—Connolly and Hutz

[57] ABSTRACT

A process for the continuous preparation of vinyl chloride polymers containing at least 85 weight percent of polymerized vinyl chloride units in an aqueous emulsion in the presence of at least one water soluble catalyst and 1.5 to 3.5 weight percent (calculated on the monomer(s)) of at least one water soluble salt of an aliphatic, saturated monocarboxylic acid having the formula

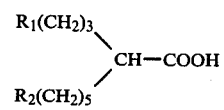

wherein $R_1$ and $R_2$ are equal or different each representing a saturated, branched or unbranched alkyl radical having 1 to 5 carbon atoms or of at least one of said water soluble salt in mixture together with at least one known emulsifier being an organic compound containing sulfonic acid-groups. The resulting polymers show an equally excellent thermostability in mixture with one of a multiplicity of known stabilizers especially of the lead-, tin- or barium/cadmium type.

4 Claims, No Drawings

PROCESS FOR THE CONTINUOUS MANUFACTURE OF VINYL CHLORIDE POLYMERS

This application is a continuation of application Ser. No. 891,192 filed Mar. 29, 1978 now abandoned.

The present invention relates to a process as claimed in claim 1.

The expert skilled in the art knows that homo- and copolymers or graft polymers of vinyl chloride have a differing aptitude of being stabilized by known heat stabilizers depending on the kind of manufacture of these polymers. For example, emulsion polymers prestabilized with inorganic salts of alkaline reaction, such as sodium carbonate, may be stabilized well with diphenyl-thiourea, especially in the case where the subsequent processing temperatures are not too high, for example below 200° C. On the other hand, the stabilizing action of diphenylthiourea in suspension and bulk polymers of vinyl chloride is rather poor.

Such differences are observed furthermore when using known metal containing stabilizers, for example lead compounds, barium/cadmium compounds or tin compounds, depending on the kind of polymerization (emulsion, suspension, bulk polymerization) chosen, and even within one polymerization method, depending on the conditions chosen, especially on the polymerization auxiliaries employed. When the polymerization formulation is altered in order to improve the aptitude for stabilization of the polymer product in any sense, this results very often in other disadvantages, such as poor yield and processability, reduced aptitute for stabilization with other stabilizer classes etc.

In order to avoid a multitude of types which causes confusion and failure in the processing industry, which requires an undesirable extension of stock and thus reduces the profitability of the production, it is desirable to manufacture in a manner as economic as possible one polymer type only, if possible, or at least very few types which can be stabilized as universally as possible for further processing. The object of the present invention is to provide a corresponding process.

German Auslegeschrift No. 1,223,556 describes a process for the polymerization of ethylenically unsaturated compounds in aqueous phase and in the presence of catalysts and salts of monocarboxylic acids of the formula

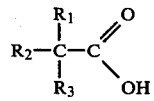

having a total of from 11 to 32 carbon atoms in the molecule, in which formula $R_1$ and $R_2$ each are an alkyl group, $R_3$ is an alkyl group or a hydrogen atom, and two or three of the groups directly linked to the tertiary or quaternary carbon atom optionally are linked with each other (cycloalkyl groups being counted among the alkyl groups). This process is said to be especially suitable for the polymerization at temperatures below 10° C.

Among a multitude of ethylenically unsaturated monomers, vinyl chloride is cited, and in one Example, the homopolymerization of vinyl chloride according to an obviously batchwise process is described. As emulsifiers there are used in this case sodium salts of unsaturated aliphatic monocarboxylic acids having from 11 to 32 carbon atoms in the molecule, the carboxyl group of which is directly linked to a tertiary or quaternary carbon atom. There is no precise indication as to what sodium salt was used.

German Pat. No. 1,645,672 discloses a process for the polymerization and copolymerization of vinyl chloride in aqueous emulsion with the use of a polymer seed latex in the presence of water-soluble salts of aliphatic, saturated monocarboxylic acids branched in alpha-position to the carboxyl group and having at least 8 carbon atoms per molecule as emulsifiers. Suitable monocarboxylic acids correspond to the formula cited sub German Auslegeschrift No. 1,223,556; however, $R_1$ $R_2$ and $R_3$ have an extended meaning, since they may represent alternatively aryl or aralkyl groups. Advantageously, monocarboxylic acids having from 11 to 28, especially 15 to 19, carbon atoms should be used.

According to German Pat. No. 1,745,561, the process of German Pat. No. 1,645,672 may be alternatively carried out by using instead of the salts of the monocarboxylic acids described there the salts of monocarboxylic acids having the following formula

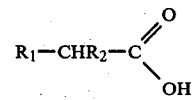

in which $R_1$ is a *branched* alkyl group, and $R_2$ a linear or branched alkyl group or a hydrogen atom; at least 50%, preferably at least 80%, of $R_2$ being hydrogen atoms, and the sum of the carbon atoms of $R_1$ and $R_2$ which may be alternatively linked to form a ring is at least 6.

As the Examples prove, the cited three processes relate without exception to batchwise (discontinuous) emulsion polymerization processes. When these processes are to be adapted to the continuous emulsion polymerization of vinyl chloride, drawbacks occur, especially with respect to the space/time yield to be obtained in connection with the aptitude of the polymer product of being stabilized under heat with lead, barium/cadmium, or tin stabilizers, as this results from the Comparative Tests described further below.

It has now been found that a selection from the multitude of salts of branched monocarboxylic acids according to German Auslegeschrift No. 1,223,553 and German Pat. Nos. 1,645,672 and 1,745,561 used in the continuous polymerization of vinyl chloride in aqueous emulsion brings about a surprisingly good aptitude for stabilization under heat of the polymer product with lead, barium/cadmium or tin stabilizers, as well as high space/time yields in the polymerization.

The invention provides a process for the continuous manufacture of homo- or copolymers or graft polymers of vinyl chloride containing at least 85% by weight (relative to the total polymer) of polymerized vinyl chloride units, in aqueous emulsion, in the presence of at least one water-soluble catalyst, from 1.5 to 3.5% by weight (relative to the monomers used) of at least one water-soluble emulsifier and, optionally, further polymerization auxiliaries, which comprises using as water-soluble emulsifier a water-soluble salt of an aliphatic, saturated monocarboxylic acid of the formula

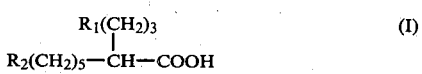

$$R_2(CH_2)_5-\overset{R_1(CH_2)_3}{\underset{|}{CH}}-COOH \quad (I)$$

in which $R_1$ and $R_2$, being identical or different, each are a saturated, linear or branched alkyl having from 1 to 5 carbon atoms, or a mixture of one such salt with at least one sulfo group containing, organic compound known as emulsifier.

Because of the favorable properties of the polymerization mixture during the polymerization and of the polymer produced, and because of the easy preparation of the monocarboxylic acids, the water-soluble salts of those monocarboxylic acids of formula I are preferred where $R_1$ and $R_2$ are identical and represent each an alkyl radical having from 2 to 4 carbon atoms.

Especially good results are obtained with the use of 2-hexyldecanoic acid-(1).

Water-soluble salts of the cited monocarboxylic acids are those the monocarboxylic acid anion of which dissolves in water at 50° C. in a rate of at least about 0.5% by weight, relative to the solution. Preferably, the salts with alkali metals or the salts of the ammonium optionally substituted by organic groups are used. Examples of organic substituents of ammonium are one to four of the following groups: alkyl having from 1 to 6 carbon atoms, alkylaryl having from 7 to 9 carbon atoms, hydroxyalkyl having from 2 to 4 carbon atoms, halogenoalkyl having from 1 to 6 carbon atoms, polyoxyalkyl formed by reaction with ethylene oxide or propylene oxide and having 2 and/or 3 carbon atoms in the polymerized alkoxy group. Alternatively, salts of monocarboxylic acids having at least two different monocarboxylic acid anions or at least two different cations may be used in admixture with each other. Furthermore, at least two water-soluble salts the monocarboxylic acid anion and the cation of which are different may be employed in admixture with each other.

The above mixtures are used for the polymerization in amounts of from 1.5 to 3.5% by weight, relative to the monomers. Below 1.5% by weight, latices being sufficiently stable for further processing cannot be obtained in general, and above 3.5% by weight, the properties of use of the polymers formed, for example transparency, sensitivity to water, physiological acceptability etc., are deteriorated.

Preferred salts are the sodium, potassium, or ammonium salts of the monocarboxylic acids, especially the sodium salts.

Especially good results are obtained when from 1.5 to 2.8% by weight, relative to the monomers used, of the above salts of monocarboxylic acids or the mixtures of several of them are employed.

The monocarboxylic acids of formula I and the salts thereof are prepared for example by the reaction according to Guerbet (Angew. Chemie 64, 1952, pp. 213–220), in which generally a branched high molecular weight alcohol is formed first on the basis of two linear aliphatic alcohols with the use of alkaline condensation agents and dehydrogenation catalysts, according to the following scheme:

$$2\ RCH_2CH_2OH \longrightarrow RCH_2CH_2-\underset{\underset{R}{|}}{CH}-CH_2OH$$

(R being an alkyl, cycloalkyl or arylakyl radical).

This branched alcohol may then be oxidized according to known methods, for example with chromic acid, to give the carboxylic acid, and the corresponding salts may be prepared therefrom. In the Guerbet reaction, the following branched acids are formed

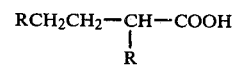

$$RCH_2CH_2-\underset{\underset{R}{|}}{CH}-COOH$$

already as by-products, and the reaction may be controlled in such a manner that about 50% of branched alcohol and about 50% of branched acid are obtained (J.Am.Soc. 76, (1954), pp. 52–56). By using alcohols having different radicals R, corresponding branched high molecular weight alcohols having different radicals R are formed (Fette, Seifen, Anstrichmittel 71 (1969), pp. 215–218), from which carboxylic acids having different radicals R and the salts thereof may be prepared accordingly.

It has been furthermore found that, in addition to the good properties provided by the process of the invention, and without adversely affecting these properties, the aptitude of being stabilized under heat with tin compounds, and the processability (gelling properties) of the polymer produced can be further improved when part of the water-soluble salts of the branched monocarboxylic acids of formula I is replaced by the sodium, potassium or ammonium salts, preferably the sodium salts, of defined sulfo group containing organic compounds known as emulsifiers. These latter compounds are employed in an amount of from about 25 to about 85% by weight, relative to the total amount of the emulsifier. The total amount of emulsifier in this case is again from 1.5 to 3.5% by weight, preferably 1.5 to 2.8% by weight, relative to the monomers used.

These sulfo group containing organic compounds known as emulsifiers are the following:

(a) Monoalkyl-sulfuric acid esters the alkyl radical of which is saturated, linear or branched and contains from 8 to about 20 carbon atoms. Preferred are those monoalkyl-sulfuric acid esters the alkyl radical of which is linear and contains from 10 to 14 carbon atoms, or the alkyl radical of which is branched and contains from 12 to 18 carbon atoms.

(b) Alpha-sulfocarboxylic acid alkyl esters the carboxylic acid component of which has from 8 to about 20 carbon atoms, preferably 10 to 16 carbon atoms, and the alkyl groups of which are saturated, linear or branched and contain from 1 to 4 carbon atoms.

(c) Sulfosuccinic acid di-alkyl esters the alkyl groups of which are identical or different, each alkyl group being saturated, linear or branched and containing from 6 to about 14, preferably 8 to 12, carbon atoms.

(d) Sulfosuccinic acid mono-alkyl esters the alkyl group of which is saturated, linear or branched and contains from 8 to about 20, preferably 10 to 16, carbon atoms.

Especially good results are obtained when the sulfo group containing, organic compounds known as emulsifiers and cited sub (a) to (d) are used in the form of their salts and in an amount of from 35 to 65% by weight, relative to the total amount of emulsifier employed.

The compounds cited sub (a) to (d) in the form of their sodium, potassium or ammonium salts may be used either per se or several of them in admixture with one another, so that the components of the mixture are different either in the cation of the salt or in the sulfo group containing inorganic anion of the salt only, or in the cation as well as in the anion of the salt.

When instead of only one salt several of the aforementioned salts are used in admixture with one another, the mixture is employed in the same amount as indicated before for one salt alone.

Generally, the emulsifiers or emulsifier mixtures to be employed in accordance with this invention are added with agitation to the polymerization mixture in the form of aqueous solutions. In order to improve their solubility, organic solvents, for example lower aliphatic alcohols, may be added to the water.

The polymerization is carried out continuously in aqueous emulsion in the presence of from 0.001 to 1% by weight, preferably from 0.01 to 0.3% by weight, (relative to the monomers), of radical forming water-soluble catalysts. Suitable catalysts are peroxydisulfates, peroxydiphosphates, perborates of potassium, sodium or ammonium, hydrogen peroxide, tert.-butylhydroperoxide, or other water soluble peroxides, as well as mixtures of different catalysts. These catalysts may be used in the presence of from 0.001 to 1% by weight, relative to the monomers, of one or more reducing substances suitable for the formation of a redox catalyst system, for example sulfites, bisulfites, dithionites, thiosulfates and aldehyde sulfoxylates such as sodium formaldehyde sulfoxylate. Optionally, the polymerization may be carried out in the presence of from 0.05 to 10 ppm, relative to metal cation of the salt per monomers, of soluble metal salts, for example salts of copper, silver, iron, nickel, cobalt or chromium.

Besides catalysts and emulsifiers, the polymerization may be carried out in the presence of buffer substances, for example alkali metal acetates, borax, alkali metal phosphates, alkali metal carbonates, ammonia or ammonium salts of carboxylic acids, as well as chain transfer agents, for example aliphatic aldehydes having from 2 to 4 carbon atoms, halogenated hydrocarbons, for example di- or trichloroethylene, chloroform, bromoform, methylene chloride, and mercaptans.

Monomers suitable for copolymerization with vinyl chloride are for example one or more of the following: olefins such as ethylene or propylene, vinyl esters of linear or branched carboxylic acids having from 2 to 20, preferably 2 to 4 carbon atoms, such as vinyl acetate, vinyl propionate, vinyl butyrate and vinyl-2-ethyl-hexoate; vinyl halides such as vinyl fluoride, vinylidene fluoride, vinylidene chloride; vinyl ethers, unsaturated acids such as maleic, fumaric, acrylic or methacrylic acids and the mono- or diesters thereof with mono- or dialcohols having from 1 to 10 carbon atoms; maleimide and the N-substitution products thereof having aromatic, cycloaliphatic and optionally branched aliphatic substituents.

For the graft copolymerization, there may be used for example elastomeric polymers obtained by polymerization of one or more of the following monomers: dienes such as butadiene, cyclopentadiene; olefins such as ethylene, propylene; styrene; unsaturated acids such as acrylic or methacrylic acid and the esters thereof with mono- or dialcohols having from 1 to 10 carbon atoms; acrylonitrile; vinyl compounds such as vinyl esters of linear or branched carboxylic acids having from 2 to 20, prefrably 2 to 4 carbon atoms; and together with at least one of the aforementioned monomers, vinyl halides such as vinyl chloride or vinylidene chloride.

Further suitable polymerization auxiliaries are described for example in H. Kainer, Polyvinylchlorid und Vinylchlorid-Mischpolymerisate, Springer edition, Berlin/Heidelberg/New York 1965, pp. 34 to 59.

After polymerization, the resulting polymers are obtained in the form of aqueous emulsions or, after drying, in the form of powders to which there may be added further substances for stabilizing and/or for improving the processing properties of said polymers.

The polymerization is generally carried out at a temperature of from 30° to 80° C., preferably from 40° to 70° C., at a conversion rate of from 87 to 95%, preferably from 89 to 91%, relative to the monomers used. The conversion percentage, in the case of continuous emulsion polymerization, is advantageously determined as described below.

The pH during the polymerization is generally from 7.5 to 10.5.

The liquor/monomer ratio is advantageously chosen in such a manner that there are obtained latices having solids contents of from about 40 to 48%, preferably 43 to 46%.

After complete polymerization and elimination of the substantial amount of unreacted monomers, the polymer is generally separated by evaporation of the water, for example in a spraydryer. Optionally, the latex may be liberated before drying from part of the aqueous liquor by physical methods, for example ultrafiltration.

The process of the invention is suitable above all for the manufacture of vinyl chloride homo- and copolymers or graft polymers having at least 85% by weight (relative to the polymer) of polymerized vinyl chloride units, and it is especially appropriate for preparing vinyl chloride homopolymers.

The process of the invention allows the manufacture of vinyl chloride polymers which can be very well and uniformly stabilized with a great number of technically important heat and light stabilizers, especially the known compounds of lead, tin, and the blended barium/cadmium compounds, according to the advantageous continuous emulsion polymerization method, and with high space/time yields. The emulsifier mixtures of the invention ensure furthermore an improvement of the aptitude of the polymer produced for being stabilized with tin compounds, and an improvement of its processing properties (gelling properties).

Known lead, tin and barium/cadmium stabilizers for vinyl chloride polymers are described for example in F. Chevassus and R. de Broutelles, The Stabilisation of Polyvinyl chloride, Edward Arnold Publ.Ltd., London 1963, pp. 102–129, and in J. Voigt, Die Stabilisierung der Kunststoffe gegen Licht und Wärme, Springer ed., Berlin/Heidelberg/New York 1966, pp. 614–643.

The following Examples illustrate the invention.

The various values were determined as follows:

K-value: according to German Industrial Standard DIN 53 726.

Unit weight: shortly after the outlet orifice of the vessel where the continuous polymerization is carried out, there is mounted a discharge opening having a diameter of 15 mm which can be closed. The latex under pressure is discharged and foams because of its content of unpolymerized monomer. As soon as the foam current has become uniform, it is allowed to flow into a metal receptacle which has been previously weighed and contains exactly 2 liters when filled to the rim. When the recipient is completely filled, the overhanging foam is skimmed over the rim and the recipient is weighed at once. The weight gain is the unit weight (U.W.) in g. On the basis of the unit weight, the conversion rate is calculated according to the following equation:

% Conversion =
$$\frac{(U.W. - g_1VC) \times \% \text{ solids}}{(U.W. - g_1VC) \times \% \text{ solids}/100\% + g_1VC + g_2VC}$$

in which the abbreviations have the following meanings:

$$g_1VC = \frac{(2 - U.W./1150 \text{ g/l}) \times 273° \text{ C.} \times 2.78 \text{ g/l} \times p}{(2.73° \text{ C.} - 8° \text{ C.} + t) \times 760 \text{ mm Hg}}$$

% solids = solids content in the polymer dispersion in % by weight, less the content in % by weight (relative to dispersion) of polymerization auxiliaries used which are not volatile at abt. 100° C. with steam.

$g_2VC$ = content of monomer vinyl chloride determined by gas chromatography according to the head space method (Zeitschrift f. analyt. Chemie 255 (1971), pp. 345–350) in the depressurized polymer dispersion being free from foam.

t = polymerization temperature in °C.
p = atmospheric pressure in mm Hg.

The conversion of vinyl chloride copolymers has to be calculated in analogous manner, if by VC in the above equations there is to be understood the sum of the amounts of monomeric vinyl chloride and the comonomer(s).

Space/time yield:

It is determined by means of a defined amount of dry polymer (in tons) which is manufacture within one unit of time (in this case: 1 month, calculated as having 658 hours of production) of uninterrupted, continuous polymerization in a defined closed chamber being at disposal for this polymerization (in $m^3$; for example contents of a polymerization vessel). The space/time yield (STY) is indicated in moto/$m^3$, and it is measured as follows:

The polymer dispersion which has formed continuously within 24 hours about 3 days after the start of the polymerization is reduced to a residual moisture content of about 0.2% by weight (relative to the polymer) by spraying in a hot air current having a starting temperature of 170° C., and weighed. The resulting amount is multiplied by 658/24 and divided by the contents of the polymerization vessel used (in $m^3$).

Aptitude for stabilization

According to the following formulations:

| lead stabilization (Pb) | |
|---|---|
| rigid | |
| vinyl chloride polymer | 100 parts |
| tribasic lead sulfate | 1.5 parts |
| montanic acid glycol ester | 0.5 part |
| polyethylene wax (M.W. abt. 2000) | 0.3 part |
| plasticized | |
| vinyl chloride polymer | 100 parts |
| tribasic lead sulfate | 1.5 parts |
| montanic acid glycol ester | 0.5 part |
| polyethylene wax (M.W. abt. 2000) | 0.3 part |
| di-2-hexylethyl phthalate | 20 parts |
| tin stabilization (Sn) | |
| rigid | |
| vinyl chloride polymer | 100 parts |
| dibutyl-tin-bis-thioglycolic acid-2-ethylhexyl ester | 1.5 parts |
| montanic acid glycol ester | 0.5 part |

| -continued | |
|---|---|
| titanium dioxide | 2.0 parts |
| Barium/cadmium stabilization (Ba/Cd) | |
| plasticized | |
| vinyl chloride polymer | 100 parts |
| Ba/Cd-laurate equimolar mixture | 1.5 parts |
| montanic acid glycol ester | 0.5 part |
| di-2-hexylethyl phthalate | 20 parts |

300 g each of polymer powder to be tested are intensely intermixed with the corresponding amounts of the other components of the formulation, and laminated without friction on a roller mill (diameter of the rolls 150 mm, length 350 mm) at a temperature of the rolls of 175° C. and a speed of 11 rpm, until the material has discolored to dark brown and begins to stick. Every 5 minutes, a test specimen having a thickness of 0.3 mm is taken off the sheet, and the degree of discoloration is determined by measuring the Yellowness Index (YI, according to ASTM D 1925-70, 1970, Book of ASTM Standards, Part 27). The YI indicates the degree of discoloration relative to a defined standard of whiteness (magnesium oxide) while using a defined source of illumination (normal light C).

The starting color (SC) of the shaped articles made from the polymer powder is set by the YI of the first specimen after a 30 minutes laminating time in the case of lead and tin stabilizers, and after a 15 minutes laminating time in the case of barium/cadmium.

The long duration stability (LD) in minutes is set by that laminating time of the specimens where the YI exceeds 150 units for the first time.

Sheet formation time

The sheet formation time is evaluated as a measure of the plasticizing speed (gelling property) of the PVC powder: 300 g of polymer powder are homogeneously mixed by means of a spatula with 4.5 g of tribasic lead sulfate (for example Naftovin T 3, Metallgesellschaft AG), 1.5 g of montanic acid glycol ester (Wachs E, Hoechst AG), and 0.6 g of polyethylene wax (Wachs PA 520, Hoechst AG). This mixture is uniformly distributed over the gap (width 0.1 mm) of a two-roller mill the rollers of which have a diameter of 150 mm, a length of 350 mm and a surface temperature of 175° C., and rotate at 11 rpm in opposite direction to each other. Subsequently, the pair of rollers is separated step by step to open the gap to 0.7 mm in such a manner that the gradually thickening rough sheet always seals the gap in order to prevent the passage of the still unplasticized material. Lamination is continued until all polymer powder is converted to a completely plasticized rough sheet. The time required to achieve this is the sheet formation time.

Examples 1 to 15 and Comparative Tests A to H are carried out as follows:

The monomer or monomer mixture, a 2.6% aqueous solution of the emulsifier(s), and a 2% aqueous solution of potassium persulfate are introduced continuously and separately into a vertically positioned autoclave having a capacity of 500 liters and provided with a flat blade paddle agitator in its upper part. 0.95 kg of emulsifier solution and 0.03 kg of persulfate solution are added per kg of monomer(s). The temperature of the reaction mixture is maintained constant (see Table). The polymer dispersion which has formed is discharged from the lower part of the autoclave while measuring the unit weight (U.W.).

The polymer dispersion contains about 47% by weight of solids, it is mechanically stable, and it is dried by spraying in an air current heated at about 170° C. (starting temperature).

The unit weight is a measure for the conversion rate in the polymerization. The lower the unit weight, the higher the polymerization temperature may be chosen for an intended polymerization degree (K value), which means a favorable space/time yield/STY) and thus a profitable manufacturing process.

The following results were obtained (see Table):

Comparative tests

| No. | Emulsifiers Amount rel. to monomer % b.w. | Emulsifiers kind | Polymerization temp. °C | U.W. g | K-Value | STY moto/m³ | Aptitude for stabilization Pb plasticized SC YI 30' | Pb plasticized LD min | Pb rigid SC YI 30' | Pb rigid LD min | Sn rigid SC YI 30' | Sn rigid LD min | Ba/Cd plasticized SC YI 15' | Ba/Cd plasticized LD min | Sheet formation time min |
|---|---|---|---|---|---|---|---|---|---|---|---|---|---|---|---|
| A | 2.6 | Iso-octadecanoic acid acc. to G.P. 1 745 561 Ex. 5 | 50 | 140 | 69–70 | 33 | 23 | 150 | 50 | 105 | 48 | 90 | 24 | 165 | 7.30 |
| B | 2.6 | Iso-tridecanoic acid acc. to G.P. 1 745 561 Ex. 1 | 50 | 140 | 69–70 | 33 | 24 | 135 | 53 | 105 | 48 | 75 | 56 | 105 | 6.00 |
| C | 2.6 | Monocarboxylic acid "Versatic 1519" acc. to G.P. 1 645 672 Ex. 1 | | | | | at U.W. ≦160 no polymerization possible | | | | | | | | |
| D | 2.6 | Lauric acid | 49 | 150 | 69–70 | 29 | 27 | 165 | 57 | 150 | 39 | 120 | 38 | 165 | 8.00 |
| E | 2.6 | SB ester | 48 | 160 | 69–70 | 25 | 95 | 75 | >100 | 45 | 16 | 90 | 52 | 60 | 5.50 |
| F | 2.6 | SBH ester | | | | | at U.W. ≦160 no polymerization possible | | | | | | | | |
| G | 2.6 | SF ester | 50 | 140 | 69–70 | 33 | 88 | 60 | >100 | 60 | 18 | 120 | 40 | 60 | 5.25 |
| H | 2.0 | LS ester | 53 | 115 | 69–70 | 48 | 83 | 105 | 99 | 90 | 13 | 150 | 42 | 60 | 6.50 |

Examples

| No. | Emulsifiers Amount rel. to monomer % b.w. | Emulsifiers kind | Quantitative ratio | Polymerization temp. °C | U.W. g | K-Value | STY moto/m³ | Pb plasticized SC YI 30' | Pb plasticized LD min | Pb rigid SC YI 30' | Pb rigid LD min | Sn rigid SC YI 30' | Sn rigid LD min | Ba/Cd plasticized SC YI 15' | Ba/Cd plasticized LD min | Sheet formation time min |
|---|---|---|---|---|---|---|---|---|---|---|---|---|---|---|---|---|
| 1 | 2.6 | 2-butyl-octanoic acid | — | 51 | 130 | 69–70 | 38 | 32 | 135 | 62 | 120 | 50 | 75 | 18 | 165 | 7.00 |
| 2 | 2.6 | 2-hexyl-decanoic acid | — | 53 | 115 | 69–70 | 48 | 30 | 135 | 53 | 120 | 51 | 75 | 23 | 165 | 7.75 |
| 3 | 2.6 | 2-octyldodecanoic acid | — | 53 | 115 | 69–70 | 48 | 24 | 135 | 48 | 120 | 45 | 75 | 26 | 165 | 8.25 |
| 4 | 2.6 | HD acid SB ester | 50/50 | 53 | 115 | 69–70 | 48 | 24 | 90 | 44 | 75 | 45 | 75 | 35 | 75 | 4.00 |
| 5 | 2.6 | HD acid LS ester | 50/50 | 54 | 110 | 69–70 | 53 | 29 | 135 | 48 | 105 | 41 | 90 | 33 | 105 | 2.75 |
| 6 | 2.6 | HD acid SBH ester | 50/50 | 51 | 130 | 69–70 | 38 | 29 | 120 | 44 | 90 | 44 | 90 | 28 | 90 | 3.75 |
| 7 | 2.6 | HD acid SF ester | 50/50 | 53 | 115 | 69–70 | 48 | 26 | 135 | 50 | 105 | 44 | 90 | 30 | 105 | 3.45 |
| 8 | 2.6 | HD acid SF ester | 15/85 | 53 | 115 | 69–70 | 48 | 31 | 105 | 62 | 75 | 20 | 105 | 10 | 45 | 6.50 |
| 9 | 2.6 | HD acid SF ester | 30/70 | 51 | 130 | 69–70 | 38 | 22 | 120 | 55 | 75 | 35 | 120 | 25 | 60 | 4.25 |
| 10 | 2.6 | HD acid LS ester | 60/40 | 54 | 110 | 69–70 | 53 | 25 | 135 | 44 | 120 | 36 | 75 | 24 | 90 | 4.00 |
| 11 | 2.6 | HD acid LS ester | 75/25 | 53 | 115 | 69–70 | 48 | 36 | 150 | 45 | 135 | 55 | 75 | 53 | 105 | 4.50 |
| 12 | 2.6 | HD acid SF ester | 60/40 | 54 | 110 | 69–70 | 53 | 21 | 150 | 41 | 120 | 37 | 90 | 14 | 105 | 4.30 |
| 13 | 3.2 | HD acid LS ester | 50/50 | 54 | 110 | 69–70 | 53 | 18 | 135 | 62 | 105 | 37 | 75 | 25 | 90 | 2.75 |
| 14 | 2.0 | HD acid LS ester | 35/65 | 44 | 115 | 78 | — | 28 | 135 | 49 | 105 | 31 | 120 | 21 | 90 | 3.75 |
| 15 | 2.0 | HD acid LS ester | 60/40 | 62 | 115 | 60 | — | 24 | 105 | 57 | 75 | 52 | 75 | 26 | 75 | 4.00 |

-continued

| LS ester |
|---| meanings of the Table:
Column 4: quantitative ratio in parts by weight rel. to the total emulsifier amount = 100 parts
Column 3: symbols of the emulsifiers (the sodium salt being used in all cases)
HD acid = 2-hexyldecanoic acid
SB ester = di-isodecyl-sulfosuccinic acid ester
LS ester = monolaurylsulfuric acid ester
SBH ester = mono-isodecylsulfosuccinic acid ester
SF ester = lauryl-α-sulfo-fatty acid methyl ester

What is claimed is:

1. In a process for the continuous manufacture of homo- or copolymers or graft polymers of vinyl chloride containing at least 85% by weight relative to the total polymer of polymerized vinyl chloride units, in aqueous emulsion, in the presence of at least one water-soluble catalyst, from 1.5 to 3.5% by weight relative to the monomers used of at least one water-soluble emulsifier: the improvement consisting essentially of using as water-soluble emulsifier a mixture of (1) at least one water-soluble salt of an aliphatic, saturated monocarboxylic acid of the formula

in which $R_1$ and $R_2$, being identical or different, each are a saturated, linear or branched alkyl having from 1 to 5 carbon atoms, and (2) at least one sodium, potassium or ammonium salt of a monoalkylsulfuric acid ester the alkyl radical of which is saturated, linear or branched and contains from 8 to 18 carbon atoms, in an amount of from 25 to 85% by weight, relative to the total amount of emulsifier employed.

2. The process of claim 1 wherein the ingredient (2) of the mixture is at least one sodium, potassium or ammonium salt of an alpha-sulfocarboxylic acid alkyl ester the carboxylic acid component of which has from 8 to 18 carbon atoms and the alkyl group of which is saturated and linear and contains from 1 to 4 carbon atoms, in an amount of from 25 to 85% by weight, relative to the total amount of emulsifier employed.

3. The process of claim 1 wherein the ingredient (2) of the mixture is at least one sodium, potassium or ammonium salt of a sulfosuccinic acid di-alkyl ester the alkyl groups of which are identical or different, each alkyl group being saturated, linear or branched and containing from 6 to 14 carbon atoms, in an amount of from 25 to 85% by weight, relative to the total amount of emulsifier employed.

4. The process of claim 1 wherein the ingredient (2) of the mixture is at least one sodium, potassium or ammonium salt of a sulfosuccinic acid monoalkyl ester the alkyl group of which is saturated, linear or branched and contains from 8 to 18 carbon atoms, in an amount of from 25 to 85% by weight, relative to the total amount of emulsifier employed.

* * * * *